United States Patent
Gordon (10) Patent No.: US 10,676,312 B2
(45) Date of Patent: Jun. 9, 2020

(54) SANITARY SLEEVE APPLICATOR FOR HOSES

(71) Applicant: Garrett M. Gordon, Concho, AZ (US)

(72) Inventor: Garrett M. Gordon, Concho, AZ (US)

( * ) Notice: Subject to any disclaimer, the term of this patent is extended or adjusted under 35 U.S.C. 154(b) by 116 days.

(21) Appl. No.: 15/844,108

(22) Filed: Dec. 15, 2017

(65) Prior Publication Data

US 2018/0134513 A1 May 17, 2018

Related U.S. Application Data

(60) Provisional application No. 62/422,194, filed on Nov. 15, 2016.

(51) Int. Cl.

| | |
|---|---|
| *B65H 57/12* | (2006.01) |
| *B08B 17/04* | (2006.01) |
| *B65H 49/20* | (2006.01) |
| *B65H 57/26* | (2006.01) |
| *F16L 57/06* | (2006.01) |
| *B65H 49/30* | (2006.01) |
| *B21D 49/00* | (2006.01) |
| *B65H 75/40* | (2006.01) |

(Continued)

(52) U.S. Cl.
CPC ............ *B65H 57/12* (2013.01); *B08B 17/04* (2013.01); *B21D 39/04* (2013.01); *B21D 49/005* (2013.01); *B65H 49/205* (2013.01); *B65H 49/305* (2013.01); *B65H 57/26* (2013.01); *B65H 75/40* (2013.01); *B65H 75/403* (2013.01); *F16L 57/06* (2013.01); *B21D 51/36* (2013.01); *B65H 2701/33* (2013.01); *B65H 2701/332* (2013.01)

(58) Field of Classification Search
CPC .... B65H 57/12; B65H 49/205; B65H 49/305; B65H 57/26; B65H 2701/33; B65H 2701/332; B65H 75/40; B65H 75/403; F16L 57/06; B21D 39/04; B21D 49/005; B21D 51/36

See application file for complete search history.

(56) References Cited

U.S. PATENT DOCUMENTS

| | | |
|---|---|---|
| 3,229,998 A | 1/1966 | Pennington |
| 3,589,632 A * | 6/1971 | Rew ...................... B21C 47/003 188/82.84 |

(Continued)

FOREIGN PATENT DOCUMENTS

| | | | |
|---|---|---|---|
| EP | 0745800 A2 * | 12/1996 | ............... F16L 11/20 |
| EP | 0745800 A2 | 12/1996 | |

*Primary Examiner* — Jermie E Cozart
(74) *Attorney, Agent, or Firm* — Mark V. Loen (57) ABSTRACT

The conceived invention provides both a film applicator and a method for placing a continuous film sleeve around a hose, or a grouping of a plurality of hoses. The sleeve thickness is approximately ½ mil to 20 mils thick, which is suitable for cleanliness protection and reducing the possibility of ripping when the hoses are dragged across a floor.

The embodied invention includes a plastic sleeve payout tube, that surrounds and encompasses the hose/hoses. The hoses are routed through the sleeve payout tube when they are hauled into a building to be cleaned. The payout tube stores a compacted length of an enclosing plastic sleeve, and the sleeve pays off as the hoses are dragged into the facility to be cleaned. The initial attachment of the plastic sleeve and hoses is by use of an adhesive tape or an outer clamping strap.

5 Claims, 9 Drawing Sheets

(51) Int. Cl.
  *B21D 39/04* (2006.01)
  *B21D 51/36* (2006.01)

(56) References Cited

U.S. PATENT DOCUMENTS

| | | | | |
|---|---|---|---|---|
| 4,310,126 | A | * | 1/1982 | Norleen ............... A01K 89/003 |
| | | | | 242/157.1 |
| 4,602,808 | A | | 7/1986 | Herron |
| 4,967,799 | A | | 11/1990 | Bradshaw |
| 2006/0102231 | A1 | * | 5/2006 | Schiller .................... B62B 3/10 |
| | | | | 137/355.12 |
| 2009/0250924 | A1 | | 10/2009 | Tisbo |
| 2010/0147987 | A1 | * | 6/2010 | Wang ................... B08B 3/006 |
| | | | | 242/395 |

\* cited by examiner

SANITARY SLEEVE APPLICATOR FOR HOSES

CROSS REFERENCE TO RELATED APPLICATIONS

This application claims the benefit of U.S. provisional application No. 62/422,194 filed Nov. 15, 2016. The entire provisional application is incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed toward utilizing sanitary sleeves in the application of cleaning equipment, such as water and vacuum hoses used in floor cleaning. It is also useable for temporary installations of water piping where external sanitation is important.

(2) Description of Related Art

Business that provide floor cleaning (carpet, tile, linoleum) transport their cleaning equipment from site to site. At one site, the equipment may be used to clean out a heavily damaged floor from rot and rain, at another site the equipment may be used to clean up a medical office that will be used to see patients. Cleaning equipment that uses hoses (vacuum and water cleaning fluid) are also dragged through the dirt environment outside of the building being cleaned. These distances can be large, depending upon the location of the transport vehicle.

It is not the usual practice for workmen to clean/sterilize their hoses between jobs. It is difficult and expensive to clean/rinse/repeat until the desired level of cleanliness is achieved. It is an important to note that this issue is largely ignored in the tile and carpet cleaning industry.

U.S. Pat. No. 3,229,998 is an example of a split pipe sleeve that is fitted to a pipe, and has a mechanical means of being reduced in size fit into the pipe size. These kinds of split designs are unsuited to a sanitary sleeve that is useful in a floor cleaning operation as they are very short and not disposable.

What is needed to provide a more sanitary cleaning operation is a method of applying a protective plastic sleeve to water and vacuum hoses used in cleaning. The plastic sleeve must be applied in long lengths, and completely encompass the types of hoses and flexible piping that will be dragged into a facility that needs floor cleaning.

BRIEF SUMMARY OF THE INVENTION

The conceived invention provides both a film applicator and a method for placing a continuous film sleeve around a hose, or a grouping of a plurality of hoses. The sleeve thickness is approximately ½ mil to 20 mils thick, which is suitable for cleanliness protection and reducing the possibility of ripping when the hoses are dragged across a floor.

The embodied invention includes a plastic sleeve payout tube, called a sleeve tube, that surrounds and encompasses the hose/hoses. The hoses are routed through the sleeve payout tube when they are hauled into a building to be cleaned. The payout tube stores a compacted length of an enclosing plastic sleeve, and the sleeve pays off as the hoses are dragged into the facility to be cleaned. The initial attachment of the plastic sleeve and hoses is by use of an adhesive tape or an outer clamping strap.

DETAILED DESCRIPTION OF THE INVENTION

To provide an improved sanitary condition for water cleaning tubing and vacuum hoses when entering a building, a continuous sleeve of plastic film is used to surround the hoses when moving into a building. Typically, water supply pump and vacuum motors are in a vehicle, such as a truck or van. The cleaning equipment includes a vacuum hose with an end wand, a water spray hose usually mounted on the end wand, and other cleaning items. Often the water is heated, and may be at a high enough temperature so that it partly turns to steam when exiting the water spray nozzle.

The conceived invention is a sleeve applicator assembly comprising a supporting frame, a sleeve tube, and an optional door brace. The sleeve applicator includes a sleeve tube in a mounting assembly, which in turn comprises a mounting plate, and door bracing members.

To create the sleeve applicator, a 9"×9" plastic mounting plate with a 6" center hole is connected to 6" diameter sleeve tube that is 15" long. The tubing is centered in the hole in the plate and is attached at one end of the tubing. The two pieces create the sleeve cannon.

The sleeve applicator is then used to store a length of about 50-200 feet of sleeve film that is a small amount larger in diameter than the sleeve tube. The desired length of sleeve film can be manually pushed over the short tube of the sleeve applicator, allowing the sleeve film to gather. Preferably, the sleeve film is large enough in diameter so that the storage of the sleeve film onto sleeve tube will be readily done manually or by use of a hand machine. It is preferable that a sufficient length of film is stored onto the sleeve tube, at least what is needed for the hoses inside the facility to be cleaned, the typical amount of film needed on a cleaning job is often 50 to 200 feet. However, the range could be much larger in some cases. Alternately, enough sleeve film is stored onto the sleeve tube to handle multiple cleaning jobs.

In a preferred embodiment, the plastic sleeve diameter is chosen so that it is a loose fit around the hoses.

When finishing up a cleaning job, the film is then cut off the end of the sleeve tube and the sleeve is removed from the hoses as they are wound up for the next cleaning job. The hoses are reverse-pulled through the sleeve applicator assembly after the cleaning job is completed. The film is preferably recycled, but is alternately simply discarded. It is not preferred that the plastic sleeve is re-used for multiple cleaning jobs.

In a preferred embodiment, the sleeve applicator assembly is re-used by adding more plastic sleeve film onto the sleeve tube.

Multiple lengths of the sleeve film can be spliced together when the film is on the sleeve cannon. This greatly improves the efficient use of film by not having a significant amount of unused film lengths. Preferably, splicing of two film lengths is done on the circumference of the plastic film with adhesive tape. When this is done, the sleeve tube can be used to support the splicing operation.

In one embodiment of the invention, the sleeve cannon is mounted inside a cardboard box for simplicity. Circular or square cutouts are made in the box for the entry of the hoses into the sleeve cannon. The sleeve cannon is mounted within the cardboard box at one end to facilitate film payoff from the film tube. Other holders for the sleeve cannon are also conceived that support the sleeve cannon at one end. To improve the mounting strength of the sleeve tube, the sleeve tube mounting plate is attached to the box with screws and an outside support bracket.

Figure 1:
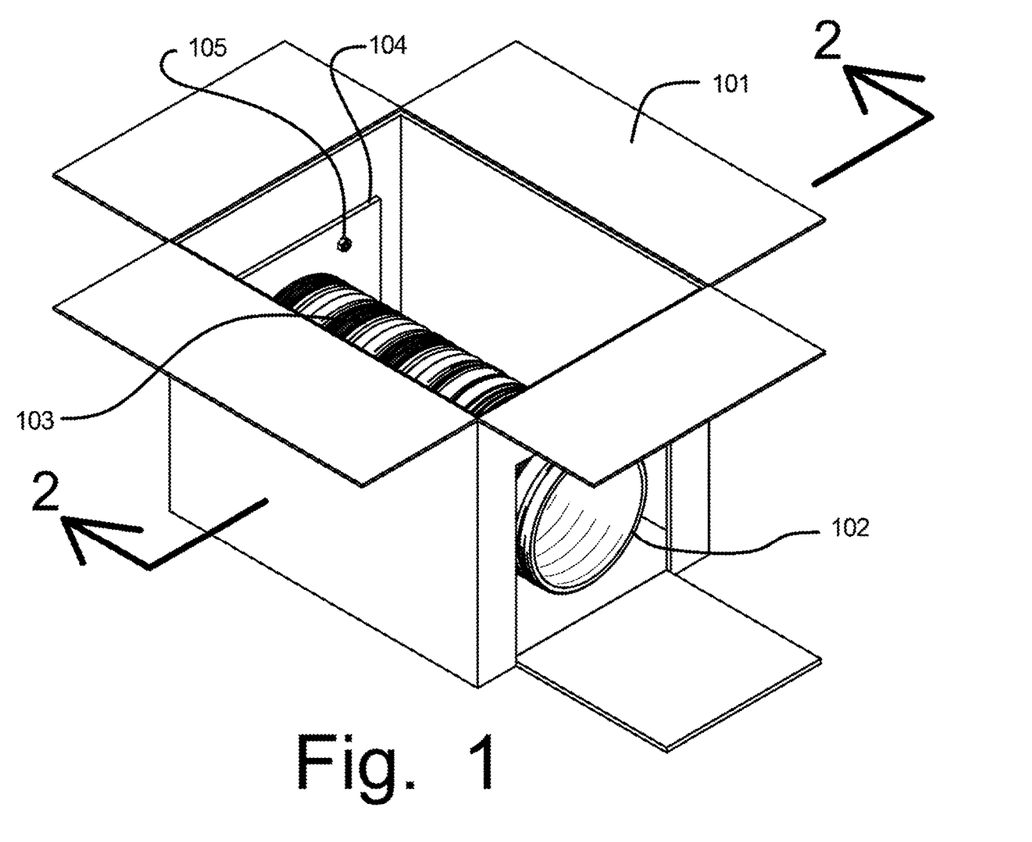
FIG. 1 is a first embodied view of the sanitary sleeve applicator.

FIG. 1 shows the sleeve tube 102 mounted within a box 101 such as a cardboard box. The six-inch diameter sleeve tube 102 is attached to a mounting plate 104 which is screwed 105 into a reinforcing bracket 106 (not seen in FIG. 1 view). Gathered film 103 is stored onto the sleeve tube for each application.

Figure 2:
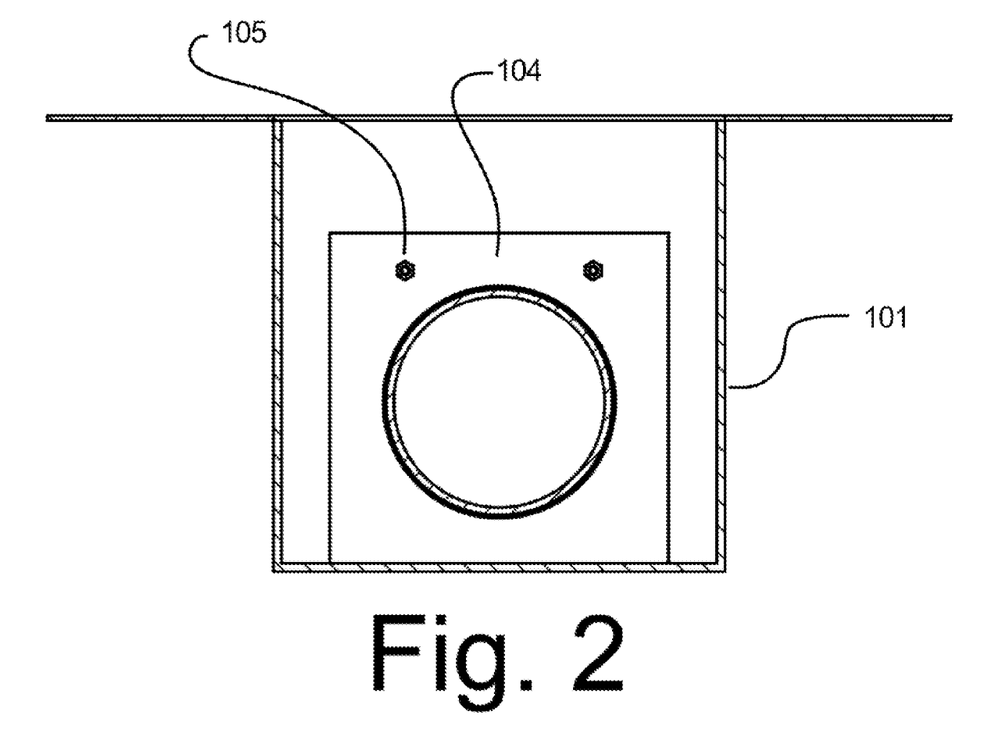
FIG. 2 show cut 2-2 through FIG. 1.

FIG. 2 is a cut through FIG. 1 to more readily show the mounting plate 104 and the screws 105 that connect the applicator tube assembly to the cardboard box 101.

Figure 3:
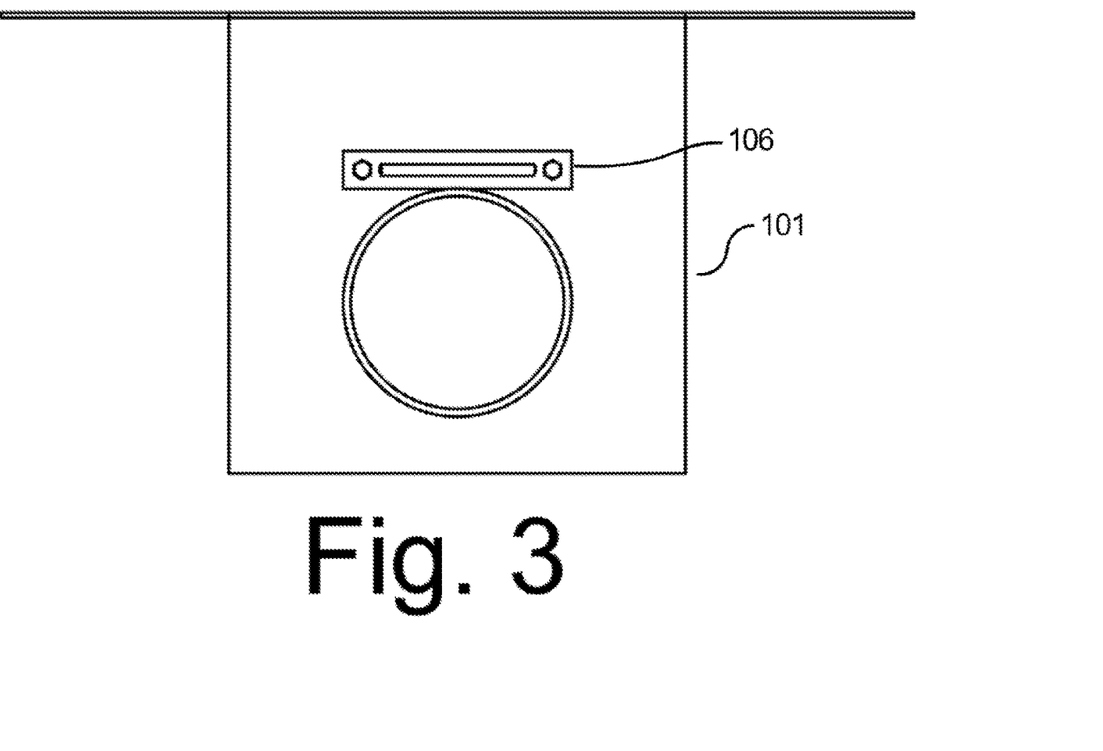
FIG. 3 is a back view of FIG. 1.

FIG. 3 is a back view of the embodied invention showing more clearly a reinforcing bracket 106 used to support the sleeve cannon within the cardboard box 101.

Figure 4:
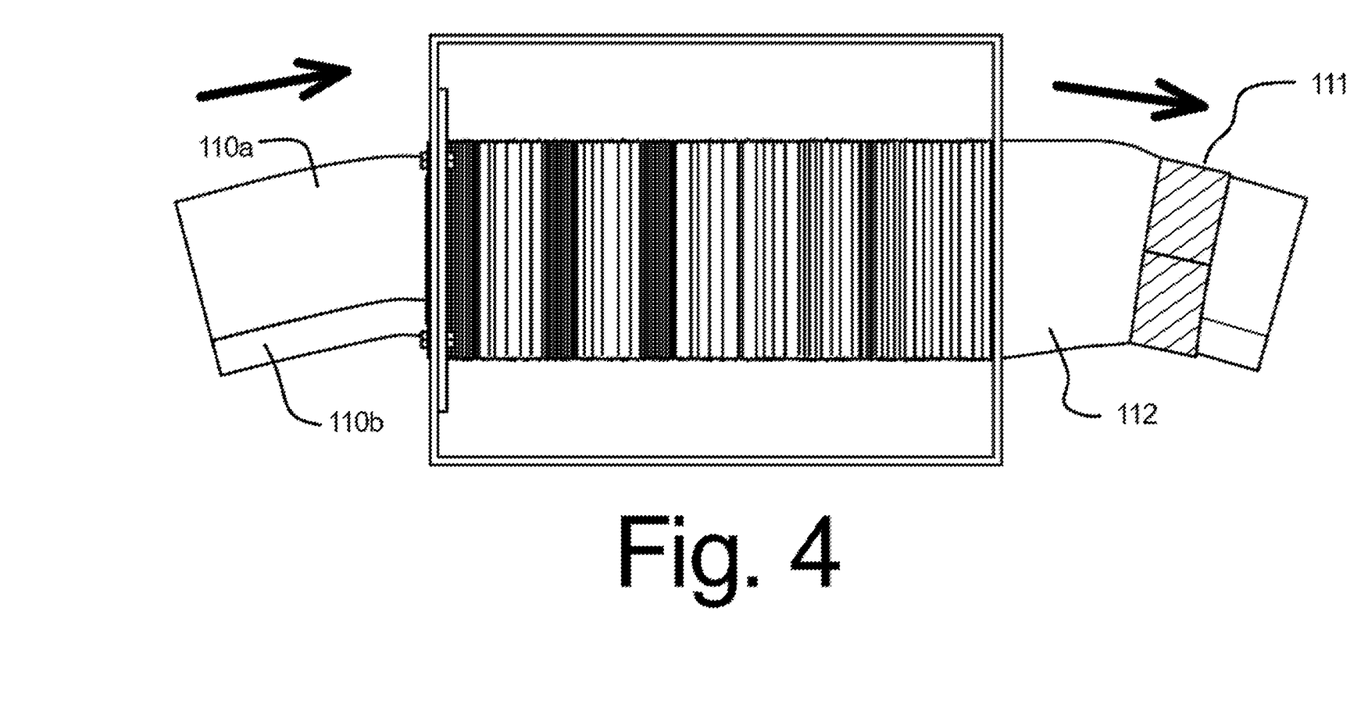
FIG. 4 shows how the sanitary sleeve applicator is used when adding a sleeve to the outer surfaces of two hoses.

FIG. 4 shows how the conceived invention is used when adding a sleeve to the outer surfaces of two hoses 110a,b. A portion of the plastic sleeve 112 is pulled off of the sleeve tube and attached to the two hoses by adhesive tape 111 or attaching wrap such as a Velcro™ band. The arrows indicate the direction of motion of the hoses through the sleeve applicator assembly.

Figure 5:
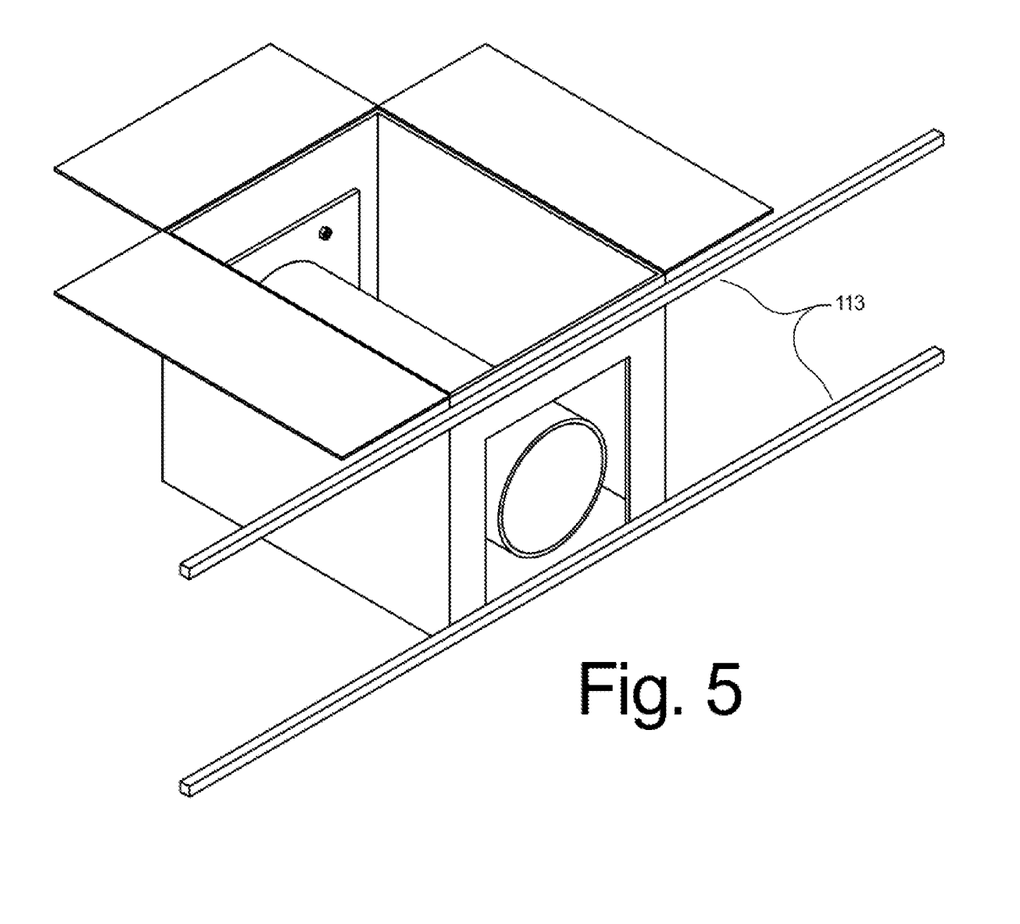
FIG. 5 shows the addition of door bracing to stabilize the film payoff box and sleeve tube.

FIG. 5 shows the addition of two braces 113 that stabilize the film payoff box when in use. The braces allow the sleeve application assembly to be located at the entry door of a facility and not be pulled into the facility. The braces are attached by adhesive tape or attaching hardware.

The use of a cardboard box is helpful to provide a sleeve cannon when there are strict sterilization requirements at a medical facility. The box can be sealed in a sterilized facility, which prevents dust and dirt from getting onto the outer surface of the plastic sleeve during transport.

Figure 6A:
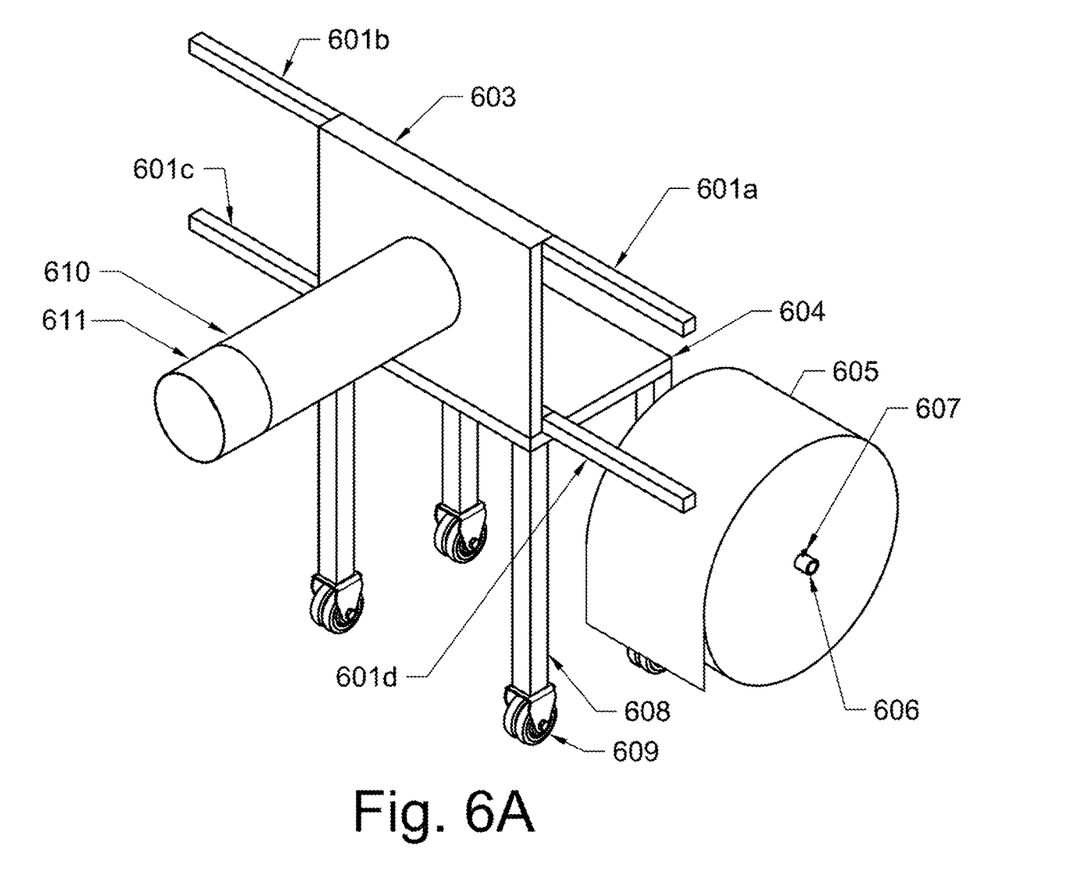
FIGS. 6A-6B illustrate a preferred second embodiment of the sleeve applicator.
Figure 6B:
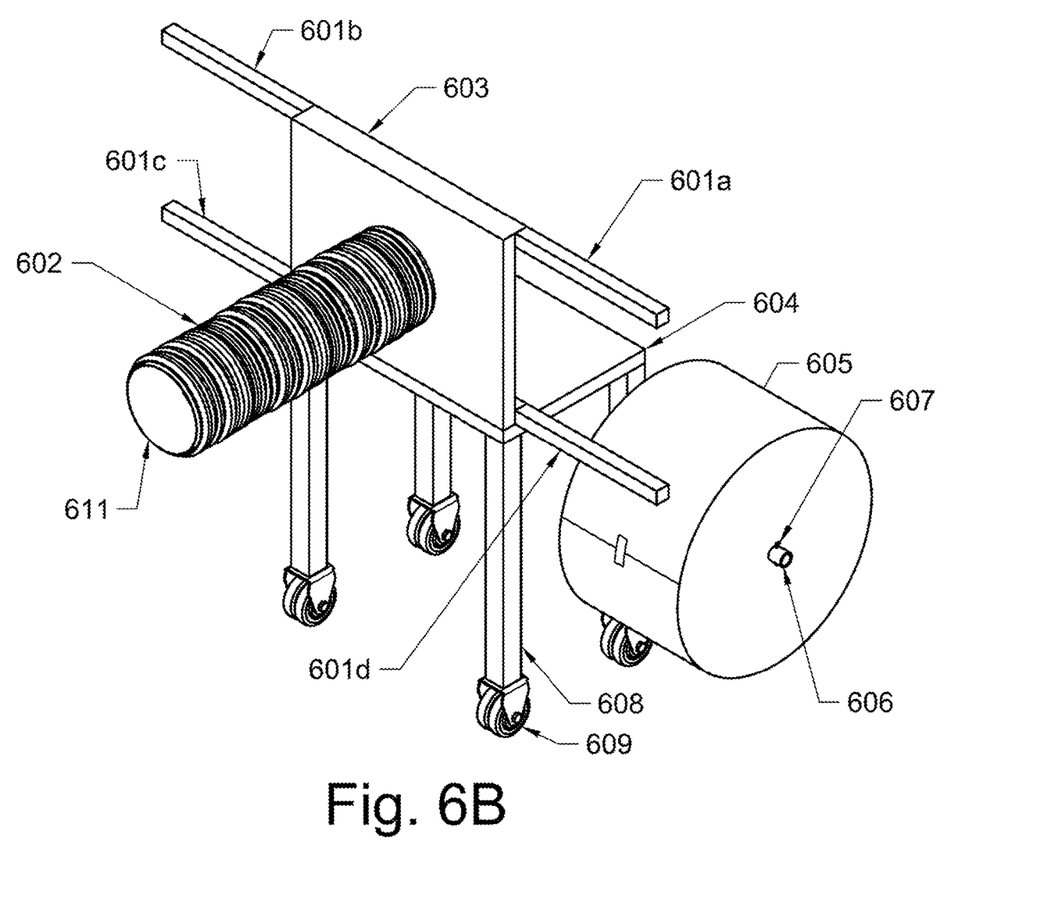

FIGS. 6A-6B illustrate a preferred embodiment of the sleeve applicator assembly. A support base 604 is used to hold a support plate 603 which, in turn, is used to support a sleeve tube 610. There are four legs 608 with wheels 609 that make the support base 604 mobile. Manual wheel locks (not shown) are optionally added to the wheels to stabilize the position of sleeve applicator assembly.

Door braces 601a-d are used to brace the sleeve applicator assembly against a doorway so that the applicator does not move when the sleeve 602 is being applied to the hoses at the door of the facility. The door braces 601a-d are removable from the support plate 603, which this is helpful when transporting the applicator. It is generally conceived that the door braces screw into the support plate, or that they are inserted via a dowel-hole interference fit. Alternate connection methods are equally employed.

A plastic sleeve roll 605 is used to payout the plastic film onto the sleeve cannon. The unwind roll center support 606 passes through the plastic sleeve roll 605 and is anchored to a leg of the support table. A locking pin 607 secures the plastic sleeve roll to the roll center support 606. When the desired amount of flexible plastic tube is placed onto the sleeve tube 610, it is cut and the sleeve is ready to be applied. Preferably, the sleeve tube 610 incorporates a slightly tapered end 611 (less than 1 degree) to facilitate placing the plastic sleeve onto the sleeve tube.

Figure 7:
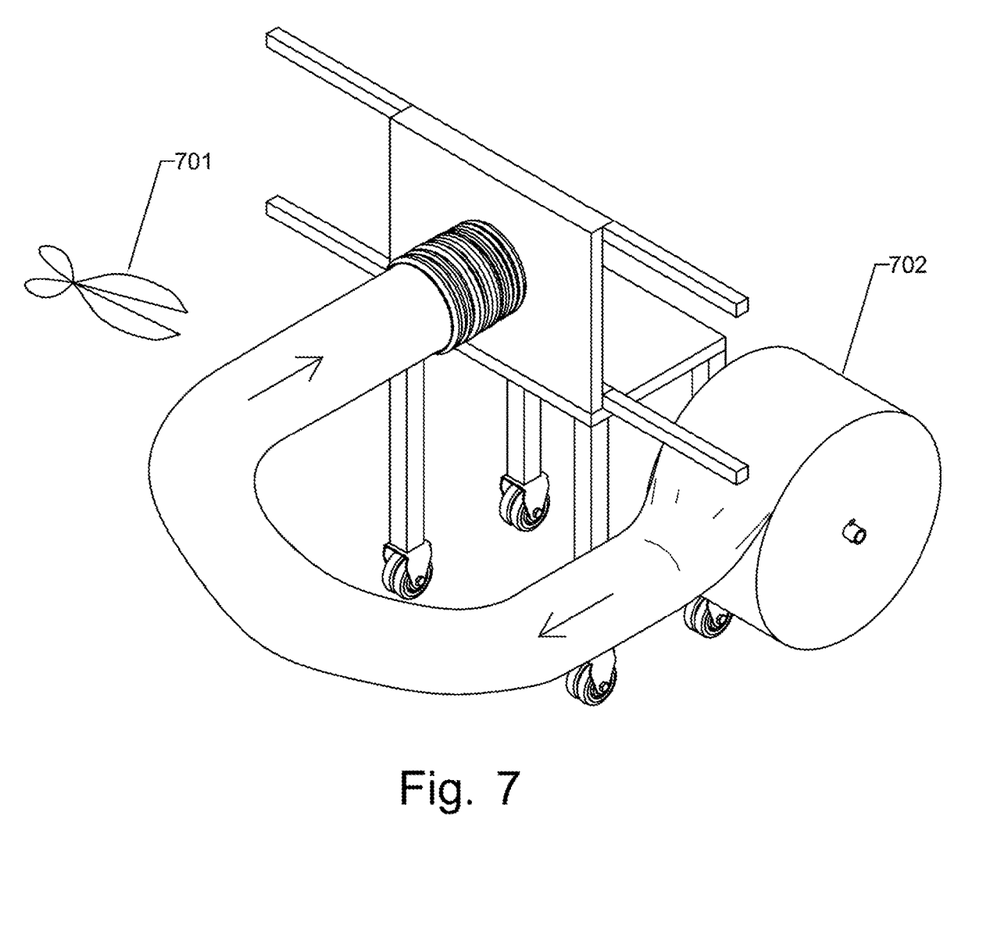
FIG. 7 shows how the sleeve is gathered onto the sleeve tube.

FIG. 7 shows how the sleeve is gathered onto the sleeve tube. The tube-shaped film, that is used for the sleeve, unwinds from the plastic sleeve roll 702 in a flattened state and then takes the shape of a tube during the process of placing it onto the sleeve tube. Scissors 701 is used to cut the sleeve to the desired length. Other cutting equipment such as a utility knife is equally used.

The length of sleeve gathered onto the sleeve tube varies with maximum length to be reached by the hoses used in cleaning. Markings are preferably added to the sleeve tube which indicate the amount of film that has been gathered onto the sleeve tube, provided that the film gathers consistently onto the sleeve tube. A mechanical counter may be added to the sleeve applicator assembly so that the length may be accurately determined. In this case, a counter would be added to a pair of opposing rolls that would press against the tube-shaped film as it is unwound.

Figure 8:
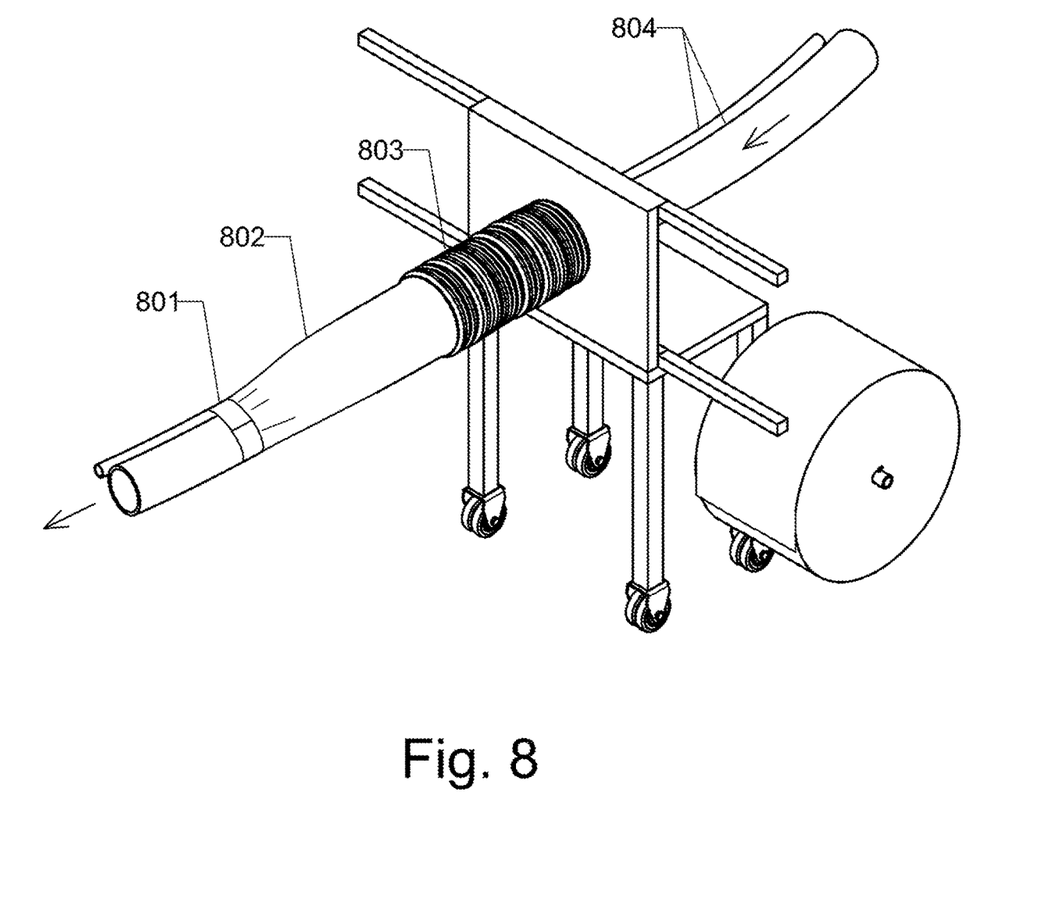
FIG. 8 shows how the sleeve is applied onto the hoses.

FIG. 8 shows how the sleeve is applied onto the hoses. The tube-shaped film 802 is paid off of the gathered sleeve 803. Tape 801 is used to initially secure the film onto the two hoses 804 being covered. The hoses 804 are continuously fed through the sleeve tube and the film continues to surround the hoses. It is understandably desirable to ensure that the gathered sleeve 803 is long enough for each cleaning job. It is generally conceived that the tube-shaped film is not re-used from job to job, and is recycled.

Although particular and typical expected dimensions are provided in this disclosure, other dimensions for protecting hoses can be adapted for particular uses.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A plastic sleeve applicator assembly for hoses comprising:
  A. a base support frame comprising,
    1. a horizontal plate,
    2. a plurality of legs attached to said horizontal plate, and
    3. a wheel attached to the distal end of each said plurality of legs,
  B. a sleeve cannon comprising:
    1. a sleeve tube,
    2. a sleeve tube mounting assembly comprising:

a. a vertical mounting plate that incorporates a centralized hole substantially the same diameter as said sleeve tube,
b. wherein said vertical mounting plate incorporates a plurality of removable door stop members,
3. wherein the proximate end of said sleeve tube is rigidly attached to a perimeter of said centralized hole,
C. said vertical mounting plate is attached to said horizontal plate, and
D. an unwind roll center support attached to said base support frame.

2. The sleeve applicator assembly of claim 1 wherein said sleeve tube has a diameter between 4 to 8 inches in diameter.

3. The sleeve applicator assembly of claim 1 wherein said sleeve tube includes markings and a tapered distal end.

4. The sleeve applicator assembly of claim 1 including an unwind roll of plastic film shaped in a continuous tube.

5. A method for applying a plastic sleeve onto at least one hose utilizing a plastic sleeve applicator assembly comprising:
A) providing a sleeve applicator assembly comprising:
1. a base support frame comprising,
a. a horizontal plate,
b. a plurality of legs attached to said horizontal plate, and
c. a wheel attached to the distal end of each said plurality of legs,
2. a sleeve cannon comprising:
a. a sleeve tube,
b. a sleeve tube mounting assembly comprising:
i. a vertical mounting plate that incorporates a centralized hole substantially the same diameter as said sleeve tube,
ii. wherein said vertical mounting plate incorporates a plurality of removable door stop members,
c. wherein the proximate end of said sleeve tube is rigidly attached to a perimeter of said centralized hole,
3. said vertical mounting plate is attached to said horizontal plate, and
4. an unwind roll center support attached to said base support frame,
B) placing a predetermined length of plastic sleeve onto said sleeve cannon,
C) routing at least one hose through said sleeve cannon,
D) paying off said plastic sleeve onto said at least one hose, and
E) connecting said at least one hose to said plastic sleeve at least once.

* * * * *